Aug. 5, 1969     T. C. RUSCONI     3,459,436

SUSPENSION SYSTEM

Filed Dec. 16, 1966

THEODORE C. RUSCONI
INVENTOR

Huebner & Worrel
ATTORNEYS

United States Patent Office 3,459,436
Patented Aug. 5, 1969

3,459,436
SUSPENSION SYSTEM
Theodore C. Rusconi, 927 W. Fairmont,
Fresno, Calif. 93705
Filed Dec. 16, 1966, Ser. No. 602,283
Int. Cl. B62d 21/06
U.S. Cl. 280—104          6 Claims

ABSTRACT OF THE DISCLOSURE

This disclosure sets forth a vehicle suspension system suspending a rectangular vehicle frame on a pair of axles. Arms are provided at each corner of the frame which extend vertically downward adjacent, but not attached to, the axles. A pair of cables are mounted criss-cross in the frame with each cable extended between diagonal corners of the frame and attached at each end of the axle. Pulleys are provided on the frame and arms, adjacent each corner, through which the cables are passed in a manner which supports the frame. A spring urged cable slack loop is provided at the approximate center of each cable which acts to equalize the end lengths of the cable upon movement of the frame with respect to the axle.

---

The present invention relates to an improved suspension system for a vehicle and more particularly to such a system providing resiliently cushioned support of a vehicle body which is effective to maintain the body in a predetermined substantially horizontal position irrespective of the imposition of variably positioned loads and shock forces on the body. While the suspension system of the present invention was specifically developed for automotive vehicles, it will be apparent that it is excellently suited for use with any load supporting platform which must be maintained in a predetermined substantially horizontal attitude.

The improved suspension system of the present invention is a further development and constitutes an advance in the prior art over the suspension system of my now abandoned application Serial No. 381,646 and certain prior art structures, particularly the Schwindenhammer French Patent No. 574,955 cited against my prior application. The difficulty with such prior systems is that they include conventional coil or leaf springs which physically connect the body portion of the vehicle to the supporting axles. The springs provide an undesirable damping or lag effect on the corrective equalizing forces provided by the system on that portion of the vehicle against which an external load of force is imposed. Accordingly, if a greater load is imposed at one corner of the body, the equalizing forces generated by the suspension system cause the opposite side of the body to be pulled downwardly against the force of the spring tending to lift the opposite side. This results in a substantial delay before equalization is obtained. If there is only a momentary jolt against the body by one of the wheels traversing an obstruction there is not sufficient time for the systems of the prior art to react. Consequently, the jolt is transmitted through the body which results in a rough ride. The same slow acting operation is experienced during the execution of a turn by the vehicle at which time the weight of the body tends to shift to one side. Again, the springs on the inside of the body tend to lift the inside of the body with the suspension system having to counteract such tendency by physically pulling down and lowering the inside of the body to equalize the turning forces and to maintain the body substantially horizontal. It is readily apparent that with such prior suspension systems, the use of springs physically connected between the body and the axles substantially increases the time required to stabilize the body during the imposition of variable loads thereon which is not acceptable in commercial embodiments of these structures.

Therefore, it is an object of the present invention to provide an improved suspension system for vehicles.

Another object is to provide such an improved suspension system which eliminates the usual spring mounting between the body and the axles of the vehicle.

Another object is to provide an improved suspension system for vehicles which is capable of providing an immediate equalizing reaction to maintain the body in a substantially horizontal position.

Another object is to provide an improved suspension system for vehicles which eliminates the need for individual springs and other shock absorbing elements at each wheel on the vehicle.

Another object is to provide an improved suspension system for vehicles which eliminates the need for auxiliary sway preventive devices.

Another object is to provide an improved suspension system for vehicles which affords the advantages of increased driver comfort and safer driving conditions.

Other objects and advantages of the present invention will subsequently become more clearly apparent upon reference to the following description and accompanying drawing.

Figure 1:
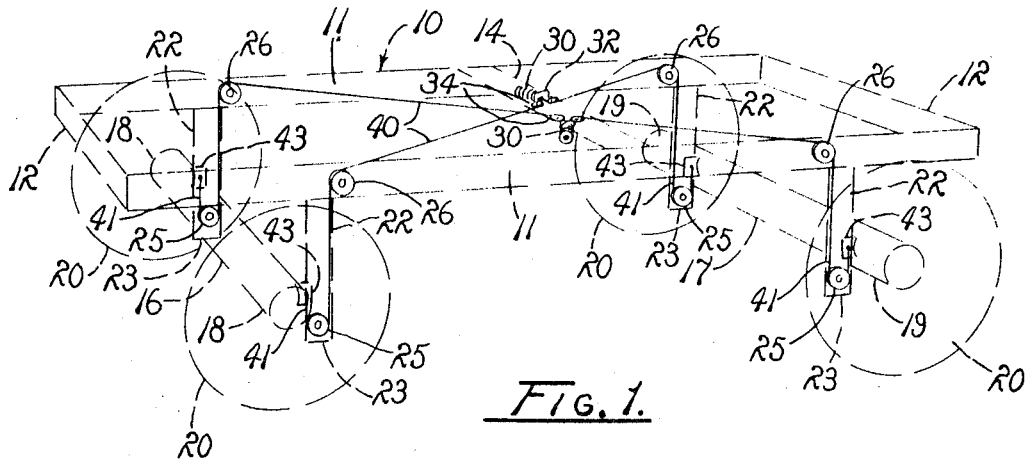
FIG. 1 is a perspective view of an improved suspension system embodying the principles of the present invention mounted on a four-wheeled vehicle frame.

Referring more particularly to the drawing, the improved suspension system of the present invention is shown associated with a four-wheeled vehicle having a substantially rectangular body or frame 10. The frame has a pair of spaced substantially parallel side members 11 rigidly interconnected by end members 12. A transverse brace 14 is rigidly mounted between the side members intermediate the end members 12. A pair of front and rear axles 16 and 17, respectively, are disposed in predetermined spaced relation beneath the frame in closely spaced substantially parallel relation to their respectively adjacent end members 12. The front and rear axles include opposite ends 18 and 19, respectively, which individually rotatably support ground engaging wheels 20.

A plurality of elongated suspension arms 22 are extended in depending relation from the side members 11 of the frame in spaced adjacent relation to the ends 18 and 19 of the front and rear axles 16 and 17 and include lower ends 23 extended below their respective axles. A plurality of pulleys 25 are individually rotatably mounted on the lower ends 23 of the arms. A plurality of identical pulleys 26 are individually mounted on the side members 11 of the frame 10 upwardly adjacent to the arms 22 by angularly disposed mounting blocks 28. The diagonally opposite pulleys 26 are disposed in common planes which cross centrally of the frame.

A pair of compression springs 30 are individually mounted on the frame 10 by a pair of brackets 32 rigidly secured to the brace 14. Each of the springs circumscribe an axis disposed in a plane substantially normal to the respective planes of their associated pulleys 26. A pair of pulleys 34 are rotatably mounted on the brace 14 closely adjacent to each of the brackets 32.

Figure 2:
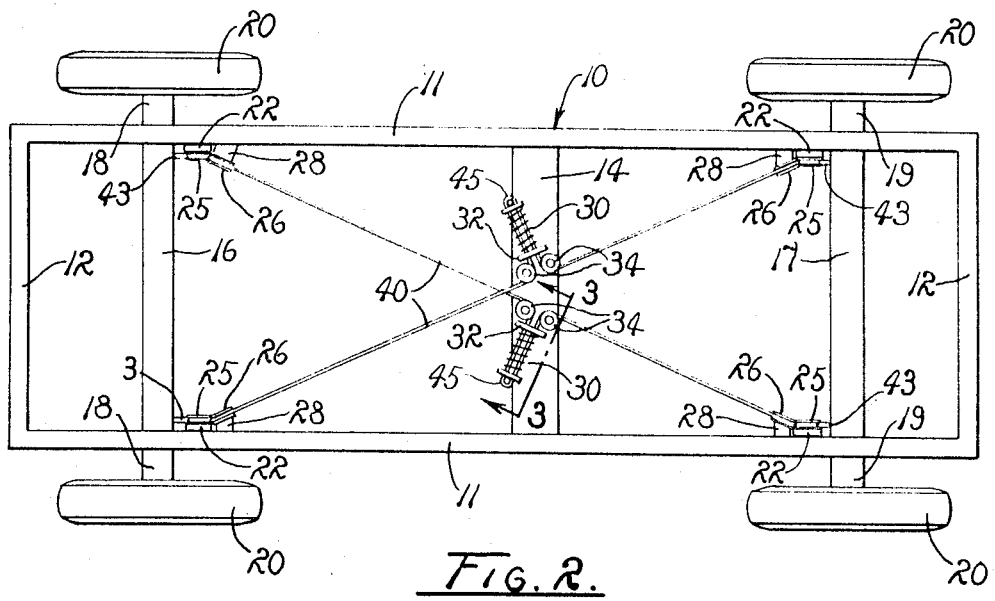
FIG. 2 is a top plan view of the improved suspension system of FIG. 1.
Figure 3:
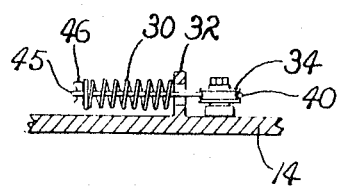
FIG. 3 is a somewhat enlarged fragmentary side elevation of a compression member and cable assembly on the frame.

A plurality of elongated flexible cables 40 include lowers ends 41 which are individually secured to brackets 43 extended from the opposite ends 18 and 19 of the front and rear axles 16 and 17. Each of the cables is trained about the lower periphery of their adjacent pulleys 25 and upwardly over their corresponding pulleys 26. Each of the cables includes an upper end 45 which is trained about its associated pulley 34 through the mounting block 28 and spring 30 for connection to the extended end of the spring by way of a mounting plate 46. As best shown in FIG. 2, the cables 40 which are extended from the right front and from the left rear of the frame 10 are connected to a common mounting plate 46 associated with the lowermost spring 30. The cables 40 which are extended from the left front and the right rear of the frame are connected to a common mounting plate 46 on the uppermost spring 30 in diagonally crossed relation with respect to the frame. It is further noted that each of the compression springs 30 is of a size capable of supporting one-half of the weight of the frame 10 and an expected maximum load with the weight of the frame being resiliently rested on the lower ends 41 of the cables around the pulleys 25 in a substantially horizontal position in predetermined spaced relation above the front and rear axles 16 and 17.

OPERATION

The operation of the described embodiment of the subject invention is believed to be clearly apparent and is briefly summarized at this point. When the vehicle is motivated in earth traversing movement, the frame 10 is supported in its normally suspended position in predetermined space relation to the axles depending upon the amount of load being carried. While it is customarily advisable to carry only a balanced load, the frame 10 will maintain a level, substantially horizontal position even with an unbalanced load by virtue of the equalizing effects of the suspension system of the present invention. If, for example, the load is concentrated above the left front wheel, that corner of the frame is lowered, which disposes the lower end 23 of the left front arm 22 farther below the front axle 16 to tension the associated cable 40 and to compress the uppermost spring 30. This permits the cable 40 associated with the right rear wheel to become slack and allows the weight of the right rear of the frame gravitationally to lower a corresponding amount. During such movement of the frame, the lowermost spring 30 is tensioned substantially to the same extent as the uppermost spring is tensioned to equalize the stresses on the frame and to maintain the same in its predetermined horizontal level position. Substantially the same action occurs when the vehicle executes a relatively high speed turn which tends to shift the weight of the load to the outside of the frame with a corresponding reduction of weight on the inside of the frame. Again, both springs are tensioned to permit the inside of the frame gravitationally to lower in equalizing relation to the outside of the frame.

During high speed travel of the vehicle when the left front wheel rides over an obstruction, it provides only a momentary shock force against the axle and frame. This raises the front axle 16 relative to the frame again to tension the cable 40 associated therewith. Since, however, there is not sufficient time for the gravitational descent of the rearward end of the frame, momentary slack is produced in the rearwardly aligned cable. However, during slow speed operation, the left front corner of the frame is raised approximately one-half the distance that the axle is raised by the obstruction. Such action lowers the right rear corner of the frame which also has a tensioning effect on the cable 40 associated therewith so that both front and rear cables are effective to compress their associated spring 30. At the same time, the lowermost spring 30 is also tensioned a corresponding amount by such frame movement again to equalize the stresses within the frame and to maintain it in the desired level position.

A similar equalization of vertical displacement of the frame 10 occurs when a trench is crossed which is at right angles to the wheels 20 of the vehicle. At slow speeds, the front end of the frame moves downwardly relative to the front axle 16, tensioning both the front cables 40 and compressing both the springs 30. Such compression of the springs permits slack in the rear cables so that the weight of the rear end of the frame is gravitationally lowered an amount corresponding to the front end of the frame. It is readily apparent that an opposite equalization of the frame occurs when the rear wheels subsequently traverse the same trench. At high speeds, there will be experienced only a momentary slack in the rear cables which does not afford sufficient time for the weight of the rear end of the frame to assist in compressing the springs. Consequently, only one-half of the weight of the vehicle is imposed against the springs which as previously described are capable of supporting the entire weight of the vehicle and an expected maximum load. At such high speeds with conventional suspension systems, the jolt experienced by the wheels traversing a trench can be so severe as to cause the frame to strike the stops on the axles. This is much less likely to occur under similar conditions in the suspension system of the present invention in view of the weight of the front end of the frame being imposed against both of the springs 30.

In view of the foregoing, it is readily apparent that the suspension system of the present invention provides improved equalization and distribution of the load and stresses imposed upon the frame of a vehicle and which is effective to maintain the frame in a predetermined substantially horizontal position. Furthermore, the improved suspension system of the present invention eliminates the usual spring mounting of the body on the axles which permits an immediate compensating reaction to the application of an unequal load or shock force against the axles and frame during operation of the vehicle.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Lettres Patent is:

1. A suspension system for a vehicle having a load support member disposed in substantially horizontal position above a pair of spaced axles having opposite ends individually rotatably mounting ground engaging wheels comprising a plurality of spacer arms extended in depending relation from the load support member individually adjacent to said wheels and having lower ends disposed below their respective axles, a plurality of guide pulleys rotatably mounted on the load support member individually adjacent to said spacer arms, a plurality of guide pulleys individually rotatably mounted on said lower ends of the spacer arms, a plurality of elongated flexible cables disposed in diagonally crossing relation on the support member and being engageable with the guide pulleys on the support member and on said spacer arms and having ends anchored to said axles adjacent to said wheels and including opposite ends on the support member, and a pair of compression springs each having a mounting end connected to the load support member and an opposite end providing connection for the opposite ends of said cables to position said support member in predetermined spaced relation above the axles and substantially to maintain the support member in said horizontal position irrespective of variations in load placement and variations in terrain traversed by the vehicle.

2. The suspension system of claim 1 in which each of said compression springs is of a size to support one-half the weight of the vehicle.

3. In a vehicle having a load support member, a plurality of ground engaging wheels, and mounting means rotatably mounting said ground engaging wheels, a suspension system for suspending said load support member on said mounting means comprising:

spacer means operatively associated with said load support means and said mounting means and disposed adjacent each of said wheels;

biasing means operatively associated with said load support member and said spacer means;

tension means interconnected between said biasing means and said mounting means adjacent each of said wheels; and guide means operatively associated with said load support member and said spacer means and disposed to engage said tension means to support said load support member in a predetermined attitude with respect to said mounting means.

4. A suspension system as described in claim 3 in which:

said tension means includes a cable connected at each end to said mounting means adjacent different wheels and connected to said biasing means intermediate of said ends; and said guide means include a pair of guide pulleys supportingly interconnected with said load support member adjacent each of said wheels, each pair of said guide pulleys being disposed to engage one end of said cable with said cable end passing over one of the pulleys of said pair and under the other pulley of said pair in its path of travel to said mounting means.

5. In a vehicle having a generally rectangular load support member, a plurality of pairs of ground engaging wheels, and axle means rotatably mounting each of said pairs of ground engaging wheels, a suspension system for suspending said load support member on said axle means comprising:

spacer arms operatively associated with said load support member and said axle means and disposed adjacent each of said wheels;

resilient biasing means interconnected with said load support member;

a plurality of flexible cables each having a first end interconnected with one of said axle means adjacent one of the pair of wheels rotatably mounted thereby, and a second end interconnected with another of said axle means adjacent one of the pair of wheels rotatably mounted thereby, each of said cables being interconnected with said biasing means intermediate said cable ends, said intermediate connecting being movable with respect to said load support member by activation of said biasing means;

and a plurality of pairs of guide pulleys, each pair being interconnected with said load support member and said spacer arms adjacent one of said wheels and disposed to engage the end of said cable connected to said axle means adjacent said wheel and pass said cable over a first of said pair of pulleys and under the second of said pair of pulleys.

6. A suspension system as described in claim 5 in which:

the ends of each of said cables are interconnected with different axle means adjacent wheels diagonally disposed with respect to said load support member;

said spacer arms each have a proximal end attached to said load support member and depend downwardly to a distal end adjacent said axle means; and the first pulley of each of said pairs of guide pulleys is rotatably mounted on said load support member adjacent said wheel, and the second pulley of each of said pairs of guide pulleys is rotatably mounted on the distal end of said spacer arm adjacent said wheel.

References Cited

UNITED STATES PATENTS 2,193,688  3/1940  Fontanesi _____ 267—11

FOREIGN PATENTS 489,412  1/1930  Germany.
835,481  9/1938  France.
574,955  4/1924  France.

PHILIP GOODMAN, Primary Examiner

U.S. Cl. X.R.

267—11; 280—124